United States Patent

[11] 3,614,323

[72] Inventors Walter L. Roberts;
Henry Lynn Newton, both of Hickory, N.C.

[21] Appl. No. 826,152
[22] Filed May 20, 1969
[45] Patented Oct. 19, 1971

[73] Assignee Superior Continental Corporation
Hickory, N.C.

[54] FILTER TO SECURE PRIVACY OF CARRIER-DERIVED TELEPHONE CIRCUITS

6 Claims, 3 Drawing Figs.

[52] U.S. Cl. .......... 179/1.5, 328/167
[51] Int. Cl. .......... H04m 1/70
[50] Field of Search .......... 179/1.5; 333/6; 328/167

[56] References Cited

UNITED STATES PATENTS

| | | | |
|---|---|---|---|
| 2,606,972 | 8/1952 | Scott | 328/167 UX |
| 3,028,554 | 4/1962 | Hilliard, Jr. | 328/167 X |
| 3,064,197 | 11/1962 | Ek | 328/167 X |
| 3,076,939 | 2/1963 | Wycott | 328/167 X |

*Primary Examiner*—Rodney D. Bennett, Jr.
*Assistant Examiner*—Brian L. Ribando
*Attorney*—Roy B. Moffitt

ABSTRACT: Disclosed herein is a filter adapted to be used in conjunction with carrier-derived telephone circuits, so as to insure privacy of that subscriber carrier circuit from intentional eavesdropping. In service, this filter is interposed between the subscriber carrier apparatus and the physical pair, being electrically in contact with each via appropriate connections. Basically, the filter is composed of three fundamental elements, a rectifier-low-pass filter combination electrically bridged by a high-pass filter. This three-element combination does not noticeably affect either carrier frequencies passing through the filter or normal voice frequency operation on the physical pair, but does weaken voice frequency signals sufficiently upon such passing through the filter so as to prohibit eavesdropping. Additionally, the rectifier-low-pass filter combination allows passage of voltage through the filter to permit use of the filter with carrier systems, which depend upon the voltage on the physical pair to power the subscriber unit or to maintain a charge on a battery located in the subscriber carrier apparatus.

INVENTORS
HENRY LYNN NEWTON
WALTER L. ROBERTS

Roy B. Moffitt
ATTORNEY

INVENTORS
HENRY LYNN NEWTON,
WALTER L. ROBERTS

INVENTORS
HENRY LYNN NEWTON,
WALTER L. ROBERTS

FILTER TO SECURE PRIVACY OF CARRIER-DERIVED TELEPHONE CIRCUITS

With the advent of ever increasing use of carrier apparatus operating on physical circuits, which also serve subscribers on a voice frequency basis, there is contiguous with such use the problem of privacy of the voice frequency subscriber circuit. As is well known in the art, a telecommunication physical cable pair, normally serving a subscriber, can be used to increase the revenue of a telephone company by means of carrier apparatus. Usually this apparatus is made up of three components, a central office unit, a subscriber unit, and an isolation filter, with the central office unit being attached to the physical cable pair near the central office, the subscriber unit being attached to the physical cable pair in close proximity to the geographical location of the newly added carrier subscriber and the isolation filter being attached to the physical pair near the voice frequency subscriber's instrument. The isolation filter is used to prevent the use of the voice-frequency derived circuit from affecting the carrier-derived circuit and also to reduce the possibility of the physical subscriber from eavesdropping on the carrier subscriber. Since the carrier subscriber is usually in close geographical location with the normal voice frequency subscriber customarily served with the physical pair, there is always the question of the voice frequency subscriber's communication privacy because intentional eavesdropping could be easily affected by attaching a telephone or an amplifier to the electrical connections leading from the input of the carrier apparatus, where both the carrier frequencies and voice frequency appears. Such carrier apparatus may be pole mounted, or mounted in the subscriber premises, to the carrier subscriber's telephone handset. By use of the herein-disclosed novel filter, such intentional eavesdropping is made impossible, yet at the same time allowing the simultaneous passage of carrier frequency and voltage from the physical pair through the filter to the carrier apparatus. Since most commercially successful carrier apparatus circuits contain a rechargeable DC battery and/or depend on a source of voltage (DC current) from the central office for recharging such a battery, or operating the unit, the desirability and utility of the herein-disclosed filter is readily apparent. An example of a carrier apparatus containing a rechargeable battery, such a battery being rechargeable by dc current emitting from a central office, source is disclosed in U.S. Letters Patent 2,829,204 (179-26), and U.S. Application for Letters Patent, S.N. 660,165, filed 8-2-67, the latter being the property of the instant Assignee, the entire disclosure of both being incorporated herein by reference.

A primary object of the instant invention is to provide a filter to be interposed between a telecommunication physical pair and a subscriber carrier apparatus to secure to the voice frequency circuit privacy of communication from the carrier-derived subscriber.

A further object of the instant invention, is to provide a filter that will simultaneously pass DC current (voltage) emanating from a central office telecommunication source, but will not permit passage of DC current of a preselected polarity in the reverse direction, along with carrier frequency signals also emanating from a central office telecommunication source to a carrier apparatus while at the same time blocking voice frequency signals traveling in either direction.

An additional object of the instant invention is to provide a filter, which not only provides the simultaneous passage of DC current (voltage) and carrier frequency signals from a central office source to a carrier apparatus, but also provides a filter that may be connected to a telecommunications physical pair without regard for polarity.

Other objects, advantages, and features of the present invention will become apparent from the following detailed description, one embodiment of which is presented in conjunction with the drawings, in which.

Figure 1:
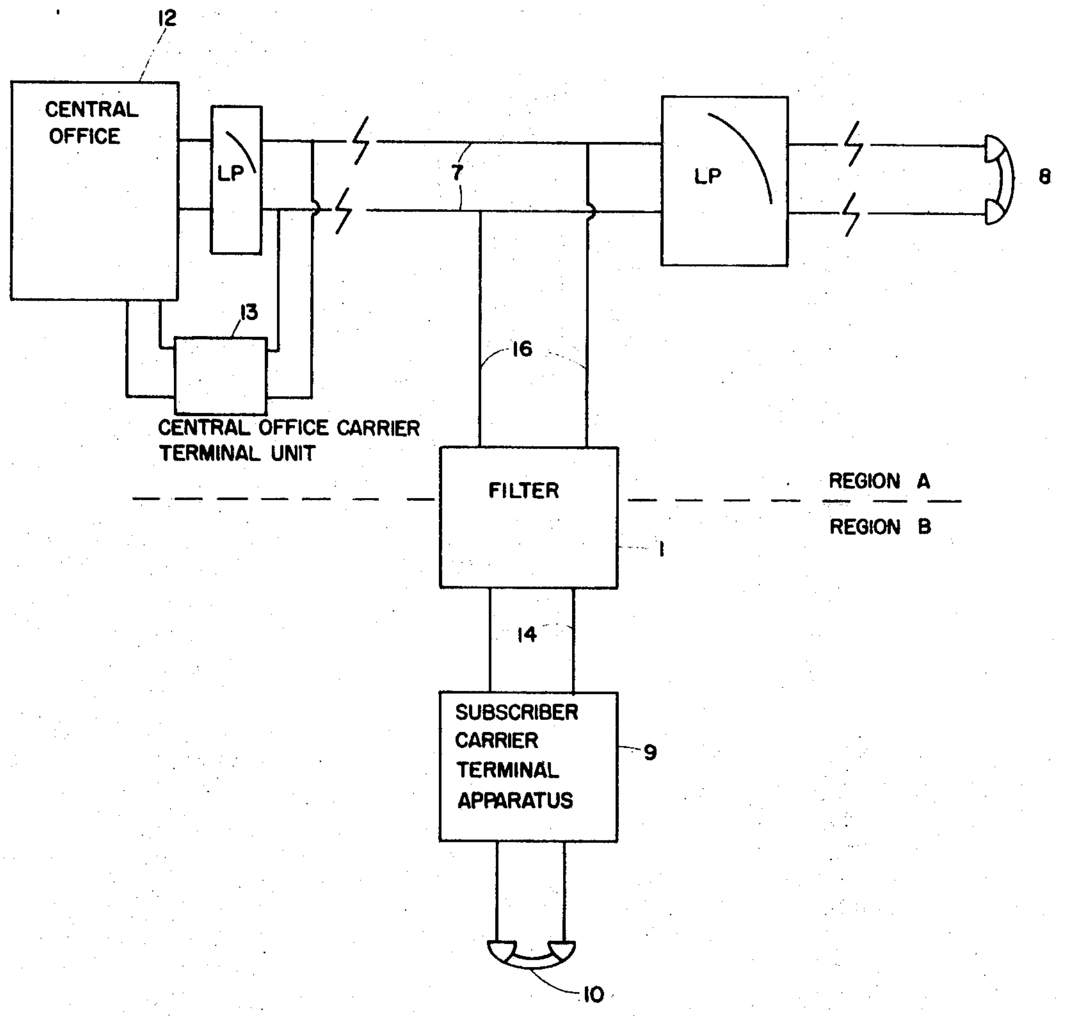
FIG. 1 is a block diagram, showing the broad concept of a system embodying the principles of the present invention.

In the drawing, FIG. 1 shows diagrammatically the arrangement according to the present invention, wherein a carrier-derived circuit is connected to a single physical subscriber circuit of a conventional telephone system, thereby enabling a second single party subscriber to be added to the one normally provided by the transmission cable pair. Thus, at a residence or a business office, which is connected by only one cable pair to the telephone central office, an additional one-party subscriber can be added without increasing the transmission cable facilities. As shown, the conventional telephone exchange central office equipment, including its switching and line-finding circuits (not shown), is represented by block 12. Its connector terminals (not shown), are connected to a standard cable pair 7 that extends to the subscriber station and are there connected to a conventional telephone set 8. Another pair of connector terminals extend from the central office equipment and are connected to a central office carrier terminal unit 13 of the carrier-derived circuit. On the other side of the central office carrier terminal unit, a pair of leads are connected to the cable pair 7.

At the subscriber station, a subscriber terminal unit 9 is connected on one side by a pair of leads 16 to the cable pair 7 and by another pair of leads 14 on the other side to the added subscriber's telephone set 10. Interposed between the subscriber carrier apparatus 9 and the telecommunications transmission pair 7 is a filter 1 that divides the telecommunication signals imposed on the physical pair 7 into two regions, A and B. Filter 1 does not noticeably affect normal voice frequency operation on the physical circuit (Region A). On the other hand, the filter 1 attenuates voice frequency signals entering the filter sufficiently to prevent eavesdropping that could be brought about by connecting a telephone or amplifier in Region B to the leads 14. Furthermore, filter 1 does not block DC charging current emitting from the central office and traveling on telecommunication physical pair 7, through leads 16 and 14 into the subscriber carrier apparatus where a rechargeable subscriber carrier apparatus powering battery (not shown) is located or where voltage is required to operate the unit. Additionally, filter 1 does not attenuate carrier frequencies above 20 kHz. required for subscriber carrier apparatus operation.

Figure 2:
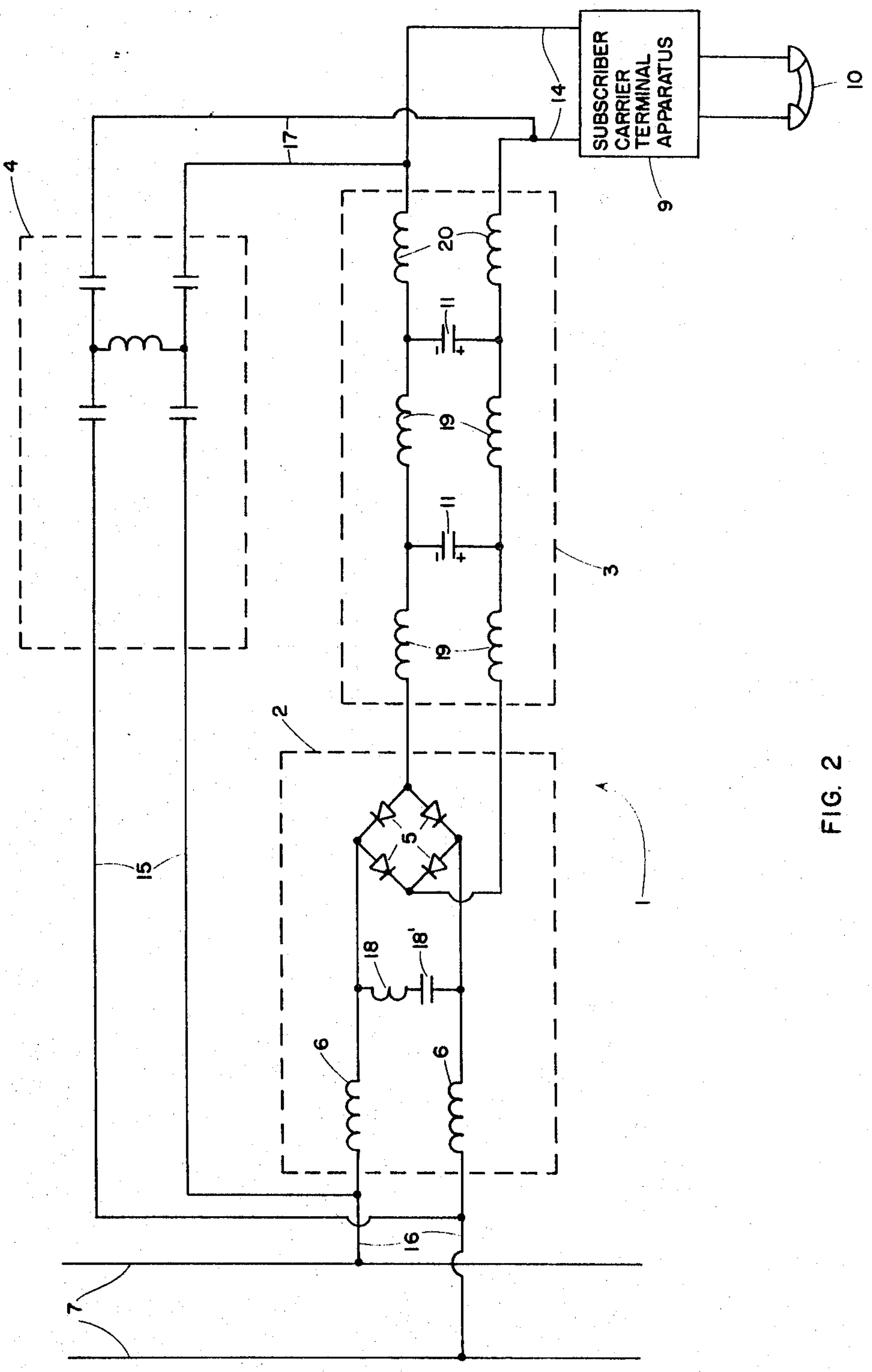
FIG. 2 is a detailed circuit diagram of the novel filter interposed between a telecommunication physical pair and a subscriber carrier apparatus and derived circuit telephone; and, FIG. 3 is a detailed schematic diagram of a further embodiment of the novel filter showing apparatus used for reducing crosstalk for certain systems.

As shown in FIG. 2, the filter 1 of FIG. 1, is basically made up of three components. The first component, as shown by element 2 is primarily a diode bridge 5, which may be referred to as a rectifier section. This rectifier section is in electrical connection with a low-pass filter as shown by element 3. Rectifier section 2 low-pass filter combination is bridged electrically by a high-pass filter 4. This bridging of the rectifier section-low-pass filter combination is achieved by leads 15 of the high-pass filter being in electrical connection with leads 16 of the rectifier section 2 and leads 17 of the same high-pass filter being in electrical connection with leads 14 of the low-pass filter 3.

In order to understand the operation of the filter 1 as shown in FIG. 2, one may envision the energy traveling down telecommunication transmission pair 7 as being the sum of three quantities: (1) DC current needed for the operation of the carrier apparatus itself or the recharging of the powering battery located in the subscriber carrier terminal apparatus; (2) carrier frequency signals used to create the derived telephone circuit as epitomized by telephone handset 10; and, (3) voice frequency signals adapted to be received by conventional telephone system as epitomized by telephone handset 8 of FIG. 1. Filter 1 as shown in FIG. 2, has been previously described as being composed of three basic components, one of which is the high-pass filter 4. Such a filter has as its primary object the passing of carrier frequency signals. It also attenuates voice frequency signals and inasmuch as the high-pass filter 4 is primarily composed of capacitors as shown, no DC current can flow therethrough. Consequently, of the DC current, voice and carrier frequency signals traveling over leads 15, only carrier frequency signals emerge from filter 4 onto leads 17, the DC current and voice frequency signals being effectively blocked by filter 4.

One of the many functions of the rectifier section 2 is to allow passage of DC current without a significant $I^2R$ (power) drop. The use of a diode bridge, see diodes 5 and their interconnection one with another to form a bridge, eliminates the necessity for observing polarity when connecting leads 16 to the transmission pair 7, which is supplying the DC. The diode bridge allows for use of polar electrolytic capacitors 11 to be used in low-pass filter 3 if such type of capacitors are desired in service. Rectifier section 2 also keeps capacitors 11 from discharging into the physical pairs while the normal voice frequency subscriber 8 is in the "off-hook" position and dialing from that physical subscriber station. Load coils 6, which are in reality a part of low-pass filter 3, offer attenuation to the whole band of carrier frequencies. Thus, these coils affectively block the majority of carrier frequency signals from the rectifier section 2.

Shown by elements 18 and 18' of FIG. 2 is a series connected LC network trap. Its function is to shunt all carrier frequency signals coming in on lead 16 not otherwise blocked by load coil 6. The blocking and shunting of the carrier frequencies by coil 6 and series tuned circuit 18 and 18' eliminates the possibility of the diode bridge allowing the voice frequencies to modulate the carrier frequencies. Without elements 6 and 18, an undesirable situation would be created because the voice frequency signal would modify the carrier signal at diode bridge 5, and this modulated signal would then be fed back on leads 16 and 15. This modulated signal, at this point being in the carrier frequency range, would pass through high-pass filter 4 and onto leads 17 and 14. The carrier subscriber could then eavesdrop on the voice frequency subscriber merely by causing telephone 10 to go to the "off-hook" position.

Low-pass filter 3 must be made up of particular components arranged in a particular manner for effective operation because of the requirement to allow the passage of DC current and to obtain maximum attenuation of the voice frequencies. Diode bridge 5 functions to provide the correct polarity of DC to capacitors 11 while eliminating the requirement of making measurements on leads 7 before leads 16 are connected. Capacitors 11 normally will accumulate a charge during service use of the filter, which will equal the voltage across their terminals.

When voice frequency subscriber 8 of FIG. 1 goes "off-hook," there is presented to the central office equipment a "-closed loop" condition, which seizes the voice frequency subscriber's line equipment—this is caused by a relay being energized as a result of the current flow in this "closed loop." This action reduces the voltage level from that which was previously present on leads 7 when the voice frequency subscriber was "on-hook." Since the capacitors 11 of low-pass filter 3 were charged to the initial level, they will discharge through leads 16 across leads 7 to the lower voltage level. Thus, this discharge of capacitors 11 will cause dial distortion to the voice frequency telephone 8, which will cause misdialing or the inability to break dial tone.

Upon the voice frequency subscriber 8 going back "on-hook," recharging of the capacitors 11 could continue to "seize" the central office equipment due to the fact that a relay once energized will hold-in with a smaller value of current than is required for the initial seizure. The continued "seizure" of the relay would not allow further usage of the circuit as it would show "busy" to incoming calls and would not allow for dialing to initiate outgoing calls.

Diode bridge 5 avoids the previously mentioned problems. This diode bridge affectively shields the low-pass filter 3 and its capacitors 11 from the physical pair. Inasmuch as it is fundamental to a diode that current passage in one direction is relatively easy, whereas in the opposite direction a high impedance or resistance is offered to a given polarity, the diode bridge is so positioned to prohibit discharge of current from the capacitors 11 from reaching the physical pair 7.

Any means for passing current in one direction with a low impedance or resistance and with a correspondingly low $I^2R$ (power) drop that also effectively impedes the flow of current in the opposite direction, will carry out the basic function of the rectifier section as epitomized by elements 5. However, the diode bridge, as shown in rectifier section 2 by elements 5, is desirable from the standpoint that one does not have to correct for polarity, (+) or (−), when attaching the filter 1 to the physical pair 7. The diode bridge configuration eliminates this need for polarity correction. On the other hand, a simple diode replacing the diode bridge or a simple means that would pass current in one direction easily and yet impede the flow of current in the opposite direction, while at the same time passing voice frequency signals, would have to be corrected for polarity when the filter 1 is connected to the physical pairs 7. Coils 20 act the same as coils 6, i.e., to block the carrier frequencies on lead 17 that passes through high-pass filter 4 and keeping such signals from being applied to low-pass filter 3.

In view of the above discussion, any voice frequency and carrier frequency signals as well as DC current flowing onto leads 16 from the physical pair 7 passes through the rectifier section where the coils 6 and tuned circuits 18 and 18' dissipate the carrier frequency signal, with the voice frequency and DC current passing through the diode bridge and thence to the low-pass filter 3. The diode bridge partially rectifies some of the voice frequency signals and such is added to the DC current flowing along with the voice frequency signal. Imposition of DC current, such as is the case when filter 1 is placed in service, on a voice frequency signal reduces somewhat the effectiveness of the diode bridge to rectify voice frequency signals to DC current. However, there is a significant voice frequency rectification nonetheless. It is important to note that the filter is designed so as to be ineffective to block signals below 100 Hz. In low-pass filter 3, voice frequency signals are dissipated, thereby allowing DC current only to emerge onto lead 14 and join with the carrier frequency signal flowing down lead 17 and thence into the subscriber carrier terminal apparatus. As previously described, the DC current is used to recharge the subscriber carrier terminal charging battery or operate the unit and the carrier frequency is used to create the derived telephone circuit as epitomized by telephone handset 10.

Coils 6 in rectifier section 2 normally are mutually coupled inductance coils as well as coils 20 of low-pass filter 3. The balance of the circuitry may contain component or element parts of known value and such are not germane to the disclosed invention. It should be noted that in the filter as disclosed, the $I^2R$ (power) drop through such a filter can be easily controlled by proper selection of the wire gauge which is used to wind coils 6, 19 and 20. As previously noted, the bridge rectifier protects the circuit against mistake in tip and ring polarity observance in installation. Furthermore, the bridge causes voice frequency circuit loading to appear as a bridged impedance equal to that loading of the rectifier-filter circuit 2 regardless of the impedance of the filter circuit 3. At steady state conditions (in-service operations), any loading is "transparent"to the novel filter 1 and in a transient state, the loading is minimized because of the rectifier-low-pass filter combination.

Figure 3:
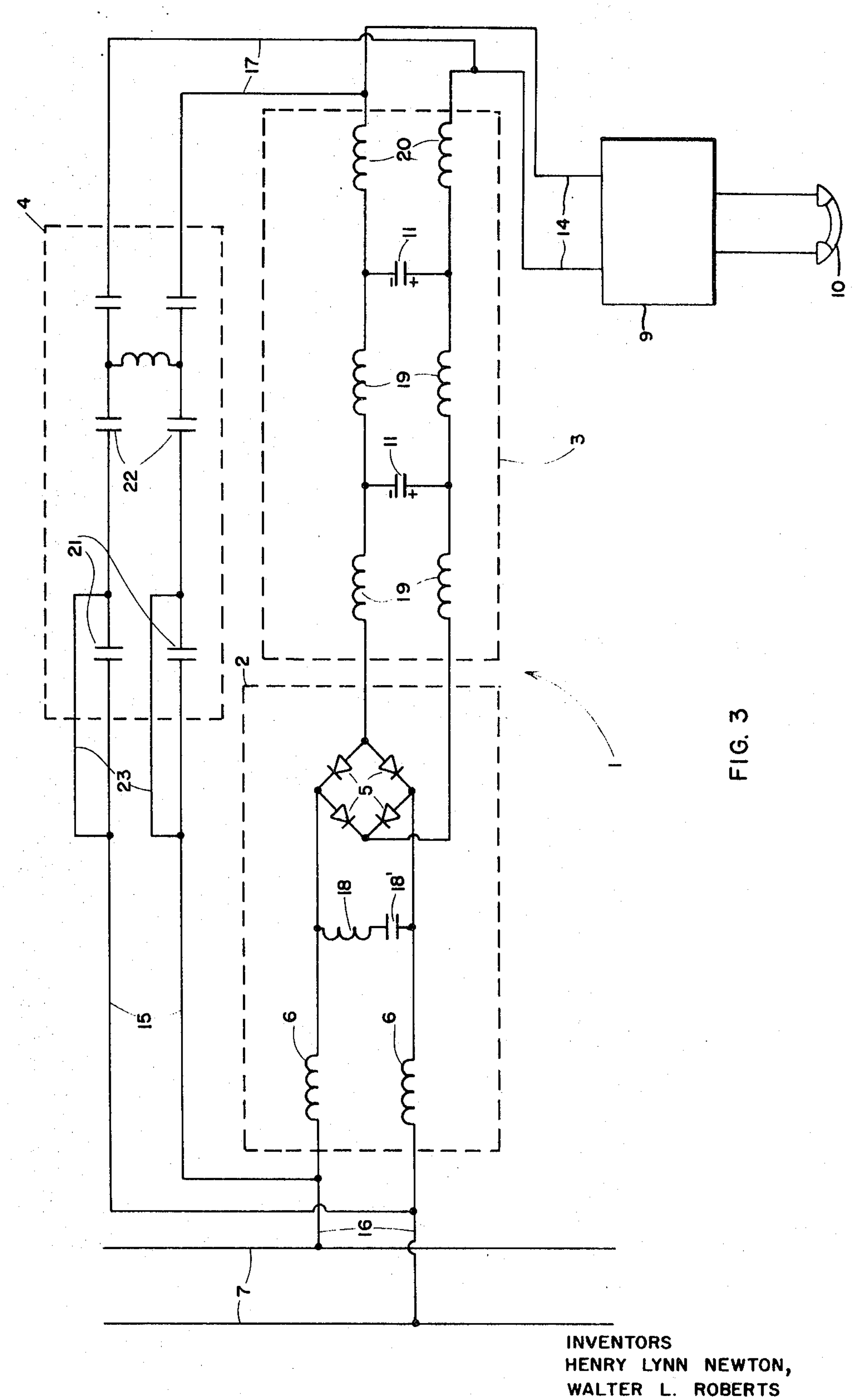

In FIG. 3, there is shown an alternate embodiment of essentially the same schematic arrangement of components as shown in FIG. 2. The differences between FIG. 2 and FIG. 3 is to be found in the high-pass filter section 4 by the added elements 21 and 23. More particularly, this difference is represented by leads 23 which effectively shunt capacitors 21. When this particular filter embodiment is employed, capacitors 22 are usually of the value of 0.068 microfarad, whereas capacitors 21 are of 0.005 microfarad in value.

When a subscriber carrier terminal apparatus is located close to a central office, the low carrier frequency used by the carrier subscriber in communicating with the central office is attenuated little, if any at all, when that particular carrier frequency signal reaches the central office via pair 7. Yet, on the other hand, a subscriber carrier terminal apparatus located more distant from a central office and using the same low carrier frequency will present the carrier frequency at the juncture of the near subscriber carrier terminal apparatus at a level, which is a function of the facility wire gauge and distance, and thus decreased from its original value. Therefore, at the juncture of this near subscriber carrier terminal apparatus and the physical pair 7, there can be present two or more carrier frequencies of sufficient differences. Thus, there will be created the problem of crosstalk between the two. Herein lies the utility of the filter as shown in the embodiment of FIG. 3. When a subscriber carrier terminal apparatus is geographically near to a central office, leads 23 will be cut thereby moving this shunt from capacitors 21. This will result in a higher attenuation of the signal emanating from the near subscriber carrier terminal apparatus so that its value at the juncture of the leads 16 with telecommunications transmission pair 7 will be more nearly that of the carrier frequency signal appearing at that juncture and emanating from a far subscriber carrier terminal apparatus more distant from a central office. This procedure could be expanded to provide a number of level coordination points.

In summary, the herein-disclosed filter has as its primary function, the prohibiting of eavesdropping by someone attaching a telephone or amplifier to the lead 14 as shown below the filter or on a portion of the physical pair identified by Region B. Additionally, the filter as disclosed does not noticeably affect a normal voice frequency operation on the physical circuit (Region A), but the filter does attenuate (weaken) voice frequency signals sufficiently to the point to prevent any eavesdropping as indicated. Furthermore, the filter does not block DC current flowing from a source in a central office through the filter to a subscriber carrier terminal apparatus. Basically, the filter herein disclosed is made up of a high-pass filter in combination with a rectifier, which is in further combination with a low-pass filter, the latter bridging the rectifier-low-pass filter combination. In actuality, the rectifier-low-pass filter portion is a low-pass filter in which a rectifier has been inserted.

We claim:

1. A filter for insuring privacy in carrier-derived telecommunications circuits, comprising:

a. a rectifier, low and high-pass filters, all possessing first and second pairs of leads;

b. said second pair of rectifier leads being in electrical contact with said first pair of low-pass filter leads, and said high-pass filter bridging the rectifier-low-pass filter combination by means of the first and second pair of high-pass filter leads being in electrical contact with the first pair of rectifier leads and second pair of low-pass filter leads respectively.

2. A filter as described in claim 1 wherein said rectifier is a rectifier bridge composed of a plurality of diodes.

3. A filter as described in claim 1 wherein said rectifier is bridged by a LC network.

4. A filter for insuring privacy in carrier derived telecommunication circuits, comprising:

a. a rectifier, a low-pass filter, and a high-pass filter, all possessing first and second pair of leads;

b. said second pair of leads of the rectifier being in electrical contact with said first pair of said low-pass filter leads, each of said first pair of rectifier leads being in electrical contact, through a coil, with said first pair of high-pass filter leads, and said second pair of said high-pass filter leads being in electrical contact with said second pair of said low-pass filter.

5. A filter as described in claim 4 wherein said rectifier is a rectifier bridge composed of a plurality of diodes.

6. A filter as described in claim 4 wherein said rectifier is bridged by a LC network.